(12) United States Patent  
Suzuki

(10) Patent No.: US 6,687,875 B1
(45) Date of Patent: Feb. 3, 2004

(54) TABLE EDITING APPARATUS

(75) Inventor: Akira Suzuki, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/506,748

(22) Filed: Feb. 18, 2000

(30) Foreign Application Priority Data

Feb. 19, 1999 (JP) .......................................... 11-041460

(51) Int. Cl.⁷ .............................................. G06F 17/21
(52) U.S. Cl. ........................ 715/503; 715/504; 715/509
(58) Field of Search ............................... 715/503, 504, 715/505, 506, 507, 509, 510

(56) References Cited

U.S. PATENT DOCUMENTS

| | | | | |
|---|---|---|---|---|
| 5,835,916 A | * | 11/1998 | Inaki et al. | 715/509 |
| 6,005,573 A | * | 12/1999 | Beyda et al. | 345/784 |
| 6,044,383 A | * | 3/2000 | Suzuki et al. | 715/509 |
| 6,112,214 A | * | 8/2000 | Graham et al. | 715/503 |
| 6,112,216 A | * | 8/2000 | Pratley et al. | 715/509 |
| 6,247,030 B1 | * | 6/2001 | Suzuki | 715/509 |

FOREIGN PATENT DOCUMENTS

| | | |
|---|---|---|
| JP | B2-7-54516 | 6/1995 |
| JP | A-7-334490 | 12/1995 |
| JP | A-10-55397 | 2/1998 |

* cited by examiner

*Primary Examiner*—Stephen S. Hong
(74) *Attorney, Agent, or Firm*—Oliff & Berridge, PLC

(57) ABSTRACT

A table editing apparatus spares users wasteful editing work in determining relative positional relations between cell boundaries of a table. The apparatus includes a cell boundary movement designating unit, a cell boundary position coincidence judging unit, and a cell boundary moving unit. The cell boundary movement designating unit designates a cell boundary to be moved and a direction in which to move the cell boundary. The cell boundary position coincidence judging unit checks cell boundaries retained by the cell boundary holding unit to see whether there is any cell boundary which is also a vertical (horizontal) cell boundary and which has the same horizontal (vertical) position as the designated cell boundary. Given the judgment from the cell boundary position coincidence judging unit, the cell boundary moving unit moves the designated cell boundary in the cell boundary holding unit to a position such that the structure of the table is changed. This eliminates wasteful cell moving operations that can leave the tabular structure unchanged.

4 Claims, 6 Drawing Sheets

| STARTING POINT | | END POINT | |
|---|---|---|---|
| HORIZONTAL POSITION | VERTICAL POSITION | HORIZONTAL POSITION | VERTICAL POSITION |
| 0 | 0 | 0 | 2 |
| 1 | 0 | 1 | 1 |
| 2 | 1 | 2 | 2 |
| 3 | 0 | 3 | 2 |
| 0 | 0 | 3 | 0 |
| 0 | 1 | 3 | 1 |
| 0 | 2 | 3 | 2 |

| STARTING POINT | | END POINT | |
|---|---|---|---|
| HORIZONTAL POSITION | VERTICAL POSITION | HORIZONTAL POSITION | VERTICAL POSITION |
| 0 | 0 | 0 | 2 |
| 2 | 0 | 2 | 1 |
| 2 | 1 | 2 | 2 |
| 3 | 0 | 3 | 2 |
| 0 | 0 | 3 | 0 |
| 0 | 1 | 3 | 1 |
| 0 | 2 | 3 | 2 |

| STARTING POINT | | END POINT | |
|---|---|---|---|
| HORIZONTAL POSITION | VERTICAL POSITION | HORIZONTAL POSITION | VERTICAL POSITION |
| 0 | 0 | 0 | 2 |
| 2.5 | 0 | 2.5 | 1 |
| 2 | 1 | 2 | 2 |
| 3 | 0 | 3 | 2 |
| 0 | 0 | 3 | 0 |
| 0 | 1 | 3 | 1 |
| 0 | 2 | 3 | 2 |

FIG.12
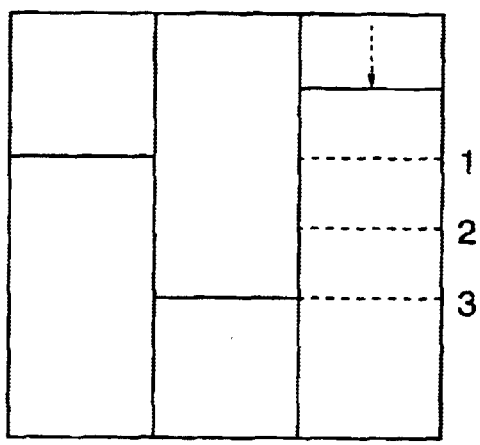
FIG.13
| CELL A | CELL B | CELL C |
|--------|--------|--------|
| CELL D | CELL E | CELL F |
FIG.14
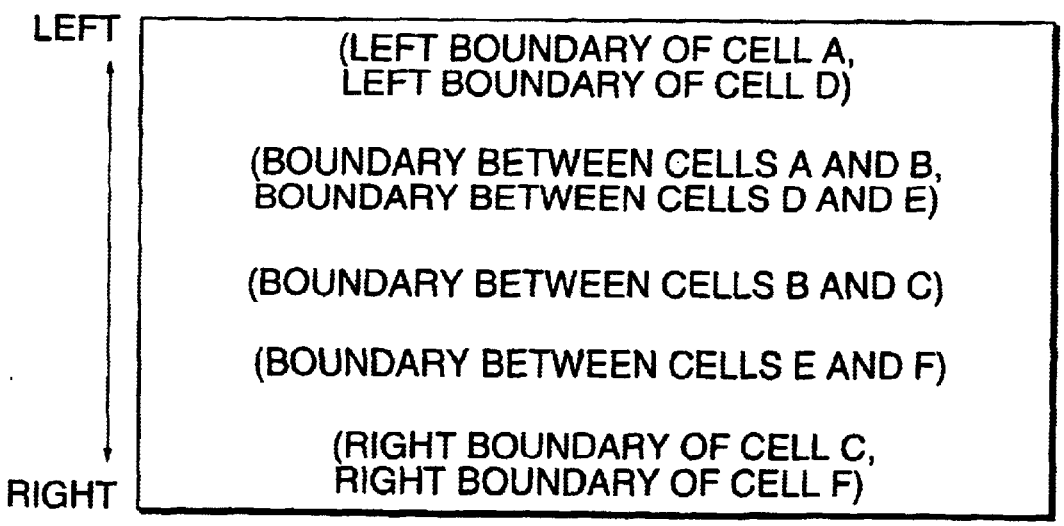

TABLE EDITING APPARATUS

BACKGROUND OF THE INVENTION

1. Field of the Invention

The present invention relates to a table editing apparatus for supporting the editing of tabular documents.

2. Description of the Related Art

Where tables were edited by conventional word processors or the like, it was often a user's task to define intervals between cell boundaries (i.e., ruled lines and cell edges). That is, when creating a table, the user adjusted and determined cell boundary intervals for optimum tabular appearance in consideration of line feeds in the cells. Illustratively, Japanese Published Examined Patent Application No. Hei 7-54516 discloses a method for supporting a user in creating tables by relocating cell boundaries for cell boundary adjustment. While offering the advantage of allowing the user to control individual cell boundaries as desired, the disclosed method can be demanding and time-consuming when applied to editing work.

Japanese Published Unexamined Patent Applications Nos. Hei 7-334490 and Hei 10-55397 disclose apparatuses for automatically determining cell boundary intervals in tables. The apparatuses discussed in the two publications are apparently capable of obtaining appropriate cell boundary intervals based on the relative positional relationships between cell boundaries and on the contents to be laid out in each cell of the table in question. In making use of one of these apparatuses, the user need only determine the relative positional relations between cell boundaries as well as the contents to be laid out in each cell of the table. The apparatus then automatically determines suitable cell boundary intervals to provide a good-looking table.

In creating a table, the user may conceivably utilize a word processor as an instrument for designating the relative positional relationships between cell boundaries as well as the contents to be laid out in the cells of the table. That is, the user employing the word processor for tabular editing organizes the relative positional relationships between cell boundaries and specifies the contents to be arranged in the cells of the table. This way of creating tables is as useful as conventional tabulating methods by allowing the user to create a table using a word processor but is more advantageous in that the user need not define detailed cell boundary intervals for good tabular appearance. In that respect, the user is less burdened with tabulating chores than before.

However, even with the use of word processors or the like to designate cell boundaries, there is a possibility that table editing work done by the conventional method using a word processor can result in a waste of time because only relative positional relations between cell boundaries are needed for the automatic creation of a table. FIGS. 2 and 3 illustrate a typical trouble experienced during conventional table editing work. Suppose that a cell boundary indicated by a broken line arrow in FIG. 2 is moved right to create a tabular makeup of FIG. 3. Although the interval between cell boundaries have changed from FIG. 2 to FIG. 3, the relative positional relation between the boundaries remains unchanged. In other words, although the interval between one cell boundary pointed to by the broken line arrow and another cell boundary designated by a solid line arrow has changed, the fact that one boundary arrowed by the broken line is located to the left of another boundary arrowed by a solid line (i.e., relative positional relationship) remains unmodified. This means that even if relative positional relations between cell boundaries and the contents of the cells are extracted from each table and input to an apparatus capable of automatically determining intervals between tabular cell boundaries, the resulting tables are structurally identical with each other. That is the editing work performed in FIG. 2 through FIG. 3 is a pure waste of time with no effects on the ultimately obtained table.

SUMMARY OF THE INVENTION

The present invention has been made in view of the above circumstances and provides a table editing apparatus for allowing users to edit tables in an easy-to-use operating environment by sparing them wasteful editing work in determining relative positional relations between cell boundaries.

In carrying out the invention and according to one aspect thereof, there is provided a table editing apparatus including a cell boundary holding unit that holds cell boundaries, a cell boundary movement designating unit that designates a cell boundary to be moved and a direction in which to move the cell boundary, a cell boundary position coincidence judging unit that, if the cell boundary designated by the cell boundary movement designating unit is a vertical (horizontal) cell boundary, judges whether or not there exists in the cell boundary holding unit any other cell boundary which is vertical (horizontal) in direction and which has the same horizontal (vertical) position as the designated cell boundary and a cell boundary moving unit that moves the cell boundary designated by the cell boundary movement designating unit.

BRIEF DESCRIPTION OF THE DRAWINGS

A preferred embodiment of the present invention will be described in detail based on the following figures wherein:

FIG. 12 is an explanatory view exhibiting a fourth example of the screen display created by the cell boundary movement designating unit;

FIG. 13 is an explanatory view of another typical table; and

FIG. 14 is an explanatory view of other typical cell boundaries retained by the cell boundary holding unit.

DESCRIPTION OF THE PREFERRED EMBODIMENT

Figure 1:
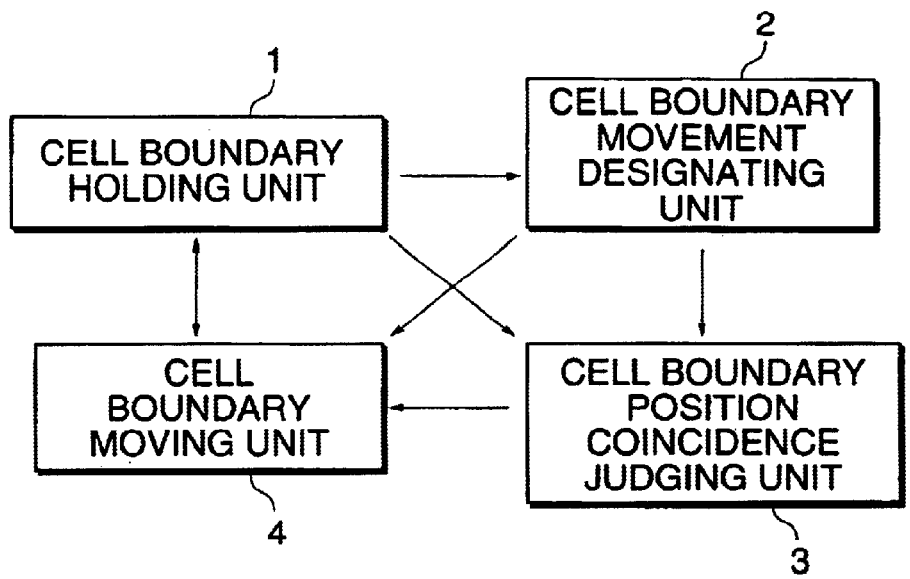
FIG. 1 is a block diagram of a table editing apparatus practiced as an embodiment of the invention.
Figure 2:
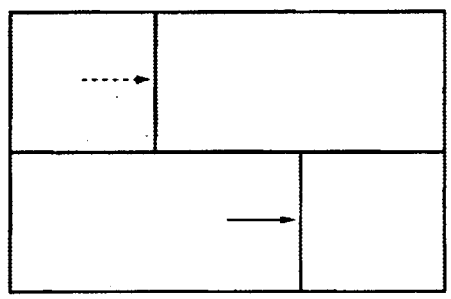
FIG. 2 is an explanatory view showing a typical trouble experienced in conventional table editing work.
Figure 3:
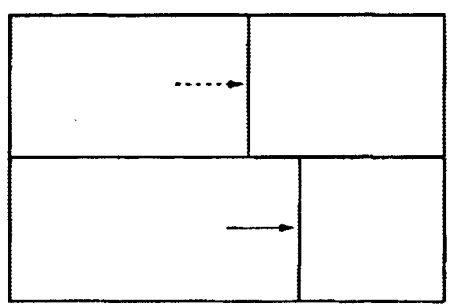
FIG. 3 is another explanatory view of the trouble experienced in conventional table editing work.

FIG. 1 is a block diagram of a table editing apparatus practiced as one preferred embodiment of the present invention. In FIG. 1, reference numeral 1 stands for a cell boundary holding unit, 2 for a cell boundary movement designating unit, 3 for a cell boundary position coincidence judging unit, and 4 for a cell boundary moving unit.

Figures 4, 5:
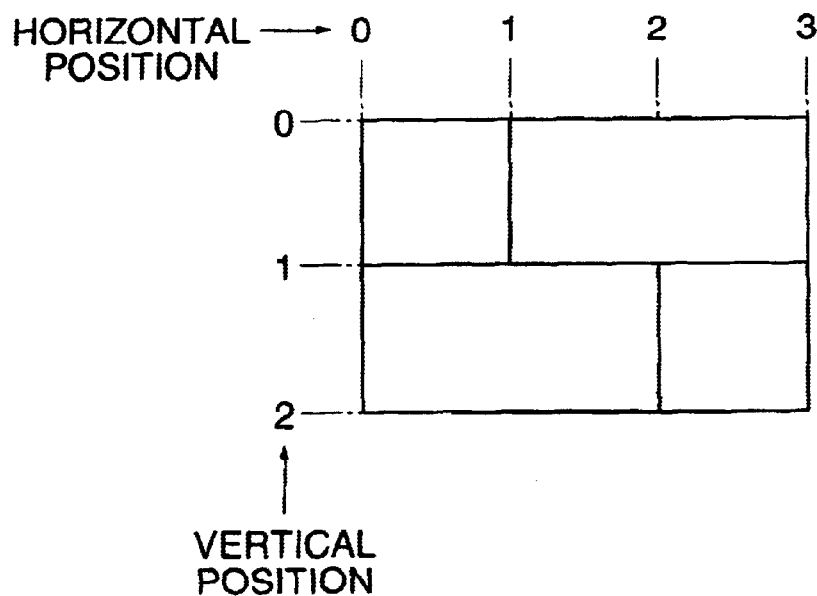
FIG. 4 is an explanatory view of typical cell boundaries retained by the cell boundary holding unit.
FIG. 5 is an explanatory view of a typical table.

The cell boundary holding unit 1 holds cell boundaries. FIG. 4 is an explanatory view of typical cell boundaries retained by the cell boundary holding unit 1, and FIG. 5 is an explanatory view of a typical table. As shown in FIG. 4, the cell boundary holding unit 1 illustratively regards each line as representative of a ruled line that serves as a cell boundary, and holds horizontal and vertical positions of the starting and end points of each ruled line. The origin of the positions is located at the top left corner of the table in question. As depicted in FIG. 5, the positions are indicated by numerals. Each cell boundary whose starting and end points are in the same horizontal position is a vertical cell boundary, as is the case with the upper four lines in FIG. 4. Each cell boundary whose starting and end points have the same vertical position is a horizontal cell boundary, and this is the case with the lower three lines in FIG. 4.

The cell boundary movement designating unit 2 is used to designate a cell boundary to be moved from among the cell boundaries held in the cell boundary holding unit 1, and a direction in which to move the designated cell boundary. Illustratively, the cell boundary movement designating unit 2 includes a display component such as a CRT for displaying cell boundaries retained by the cell boundary holding unit 1, an input component such as a touch sensitive panel or a pointing device for designating the cell boundary to be moved, and input controls such as the up, down, right and left arrow keys for specifying the direction of cell boundary movement. In operation, the cell boundary movement designating unit 2 detects the user's command to select any one of the displayed cell boundaries and the user's operation of an arrow key to designate the direction of cell boundary movement. After the detection, the cell boundary movement designating unit 2 specifies that the selected cell boundary be moved in the direction of the operated arrow key.

The cell boundary position coincidence judging unit 3 checks the cell boundaries held in the cell boundary holding unit 1 and, if the cell boundary designated by the cell boundary movement designating unit 2 is a vertical cell boundary, judges whether or not there exists any other cell boundary which is also vertical in direction and which has the same horizontal position as the designated cell boundary. If the cell boundary designated by the cell boundary movement designating unit 2 is a horizontal cell boundary, the cell boundary position coincidence judging unit 3 judges whether or not there exists any other cell boundary which is also horizontal in direction and which has the same vertical position as the designated cell boundary.

If the cell boundary position coincidence judging unit 3 has judged that there exists another cell boundary in the same position as the cell boundary designated by the cell boundary movement designating unit 2, then the cell boundary moving unit 4 moves the cell boundary designated by the cell boundary movement designating unit 2 as follows: if the cell boundary designated by the cell boundary movement designating unit 2 is a vertical cell boundary, the cell boundary moving unit 4 acquires a horizontal position of a cell boundary which exists in the direction designated for the cell boundary in question before the movement and which, among the vertical cell boundaries retained, is horizontally closer than any other cell boundary to the designated cell boundary. The cell boundary moving unit 4 then changes the position of the designated vertical cell boundary in the cell boundary holding unit 1 in such a manner that the horizontal position of the cell boundary in question will be located at a halfway point between the acquired horizontal position and the horizontal position of the designated cell boundary before the movement. If the cell boundary designated by the cell boundary movement designating unit 2 is a horizontal cell boundary, the cell boundary moving unit 4 acquires a vertical position of a cell boundary which exists in the direction designated for the cell boundary in question before the movement and which, among the horizontal cell boundaries retained, is vertically closer than any other cell boundary to the designated cell boundary. The cell boundary moving unit 4 then changes the position of the designated horizontal cell boundary in the cell boundary holding unit 1 in such a manner that the vertical position of the cell boundary in question will be located at a halfway point between the acquired vertical position and the vertical position of the designated cell boundary before the movement.

If the cell boundary position coincidence judging unit 3 has judged that there is no other cell boundary in the same position as the designated cell boundary, then the cell boundary moving unit 4 moves the designated cell boundary as follows; if the cell boundary designated by the cell boundary movement designating unit 2 is a vertical cell boundary, the cell boundary moving unit 4 acquires a cell boundary which exists in the direction designated for the cell boundary in question and which, among the vertical cell boundaries retained, is horizontally closer than any other cell boundary to the designated cell boundary. The cell boundary moving unit 4 then changes the position of the designated cell boundary in the cell boundary holding unit 1 in such a manner that the horizontal position of the acquired cell boundary will coincide with that of the designated cell boundary after the movement. If the cell boundary designated by the cell boundary movement designating unit 2 is a horizontal cell boundary, the cell boundary moving unit 4 acquires a cell boundary which exists in the direction designated for the cell boundary in question and which, among the horizontal cell boundaries retained, is vertically closer than any other cell boundary to the designated cell boundary. The cell boundary moving unit 4 then changes the position of the designated cell boundary in the cell boundary holding unit 1 in such a manner that the vertical position of the acquired cell boundary will coincide with that of the designated cell boundary after the movement.

Figure 6:
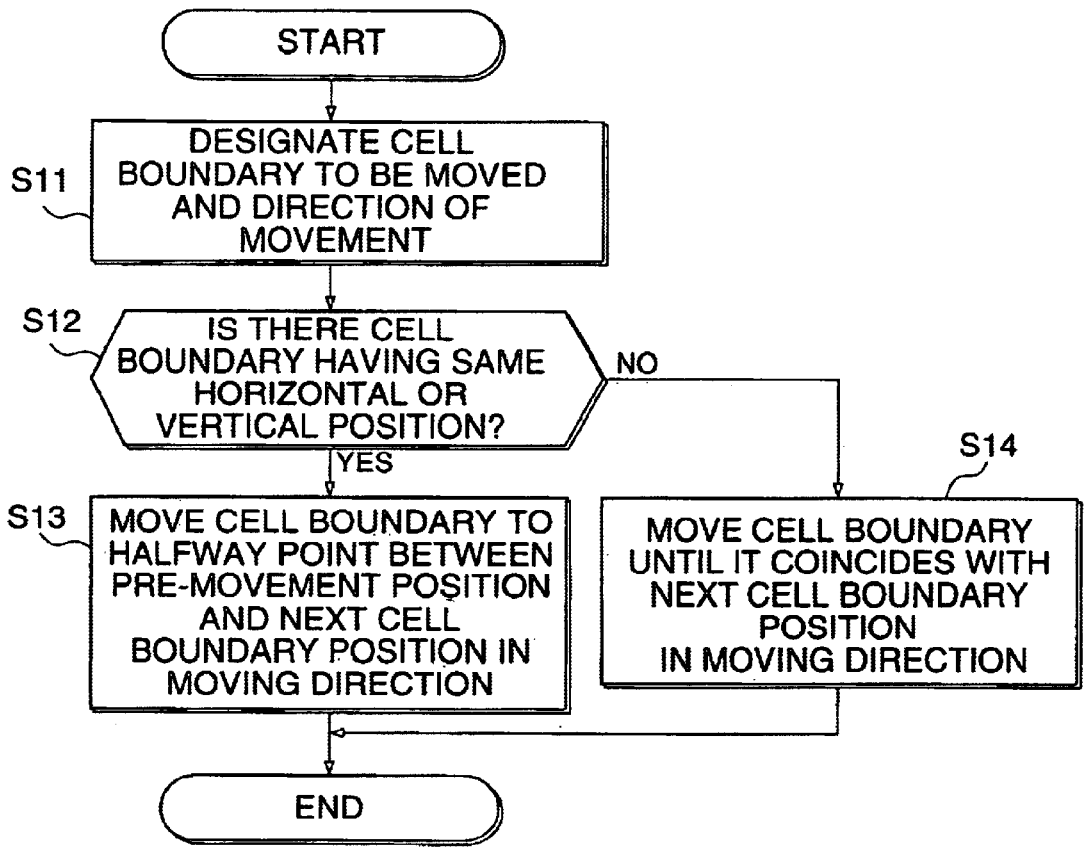
FIG. 6 is a flowchart of steps in which the table editing apparatus embodying the present invention operates.

FIG. 6 is a flowchart of steps in which the table editing apparatus embodying the invention typically operates. In step S11 of FIG. 6, the cell boundary movement designating unit 2 displays the cell boundaries held in the cell boundary holding unit 1, and receives the user's commands for designating a cell boundary to be moved and for specifying a direction in which to move the cell boundary. In step S12, the cell boundary position coincidence judging unit 3 checks the cell boundaries held in the cell boundary holding unit 1 and, if the cell boundary designated by the cell boundary movement designating unit 2 is a vertical cell boundary, judges whether or not there exists any other cell boundary which is also vertical in direction and which has the same horizontal position as the designated cell boundary. If the cell boundary designated by the cell boundary movement designating unit 2 is a horizontal cell boundary, the cell boundary position coincidence judging unit 3 judges whether or not there exists any other cell boundary which is also horizontal indirection and which has the same vertical position as the designated cell boundary. In any case, if there exists an applicable cell boundary in step S12, step S13 is reached; otherwise step S14 is reached.

In step S13, if the cell boundary designated by the cell boundary movement designating unit 2 is a vertical cell boundary, the cell boundary moving unit 4 detects a horizontal position of a cell boundary which exists in the direction designated for the cell boundary in question before the movement and which, among the vertical cell boundaries retained, is horizontally closer than any other cell boundary to the designated cell boundary. The cell boundary moving unit 4 then changes the position of the designated vertical cell boundary in the cell boundary holding unit 1 in such a manner that the horizontal position of the cell boundary in question will be located at a halfway point between the detected horizontal position and the horizontal position of the designated cell boundary before the movement. Likewise, if the cell boundary designated by the cell boundary movement designating unit 2 is a horizontal cell boundary, the cell boundary moving unit 4 detects a vertical position of a cell boundary which exists in the direction designated for the cell boundary in question before the movement and which, among the horizontal cell boundaries retained, is vertically closer than any other cell boundary to the designated cell boundary. The cell boundary moving unit 4 then changes the position of the designated horizontal cell boundary in the cell boundary holding unit 1 in such a manner that the vertical position of the cell boundary in question will be located at a halfway point between the detected vertical position and the vertical position of the designated cell boundary before the movement.

Step S14 is carried out when the cell boundary position coincidence judging unit 3 has judged that there is no other cell boundary in the same position as the designated cell boundary. If the cell boundary designated by the cell boundary movement designating unit 2 is a vertical cell boundary, the cell boundary moving unit 4 detects a cell boundary which exists in the direction designated for the cell boundary in question and which, among the vertical cell boundaries retained, is horizontally closer than any other cell boundary to the designated cell boundary. The cell boundary moving unit 4 then changes the position of the designated cell boundary in the cell boundary holding unit 1 in such a manner that the horizontal position of the detected cell boundary will coincide with that of the designated cell boundary after the movement. If the cell boundary designated by the cell boundary movement designating unit 2 is a horizontal cell boundary, the cell boundary moving unit 4 detects a cell boundary which exists in the direction designated for the cell boundary in question and which, among the horizontal cell boundaries retained, is vertically closer than any other cell boundary to the designated cell boundary. The cell boundary moving unit 4 then changes the position of the designated cell boundary in the cell boundary holding unit 1 in such a manner that the vertical position of the detected cell boundary will coincide with that of the designated cell boundary after the movement.

Where a table is edited for the purpose of acquiring relative positional relations between cell boundaries, any editing work involving no changes in such relative positional relationships is meaningless. Consider an example in which a vertical cell boundary Vtarget is to be moved rightward. It is assumed here that there exists a cell boundary Vsame whose horizontal position is the same as that of the vertical cell boundary Vtarget. It is also assumed that among the vertical cell boundaries retained, the one located to the right of the cell boundary Vsame and horizontally the closest to the cell boundary Vtarget is called a cell boundary Vright. In such a case, in S13 of FIG. 6, the cell boundary Vtarget is moved so that its horizontal position after the movement will come between the initial horizontal position of the cell boundary Vtarget (i.e., position of the cell boundary Vsame) and the horizontal position of the cell boundary Vright.

The above movement changes the positional relationship between the cell boundary Vtarget and the cell boundary Vsame from one in which the two boundaries had the same horizontal position, to one in which the cell boundary Vtarget is located to the right of the cell boundary Vsame. Any cell boundary located to the left of the cell boundary Vtarget before the movement still exists on the left after the movement because the cell boundary Vtarget has moved right; any cell boundary located to the right of the cell boundary Vtarget before the movement still exists on the right after the movement since the leftmost cell boundary Vright among the right-hand side cell boundaries is still located to the right of the moved cell boundary Vtarget. In other words, there is no change in the relative positional relations between the target cell boundary and any other cell boundary whose horizontal position is not the same as that of the target cell boundary. The explanation above also applies where a ruled line is moved left instead of right or where a horizontal cell boundary instead of a vertical cell boundary is moved up or down.

As described, if there exists any vertical (horizontal) cell boundary whose horizontal (vertical) position is the same as the vertical (horizontal) cell boundary to be moved, the above-described moving process causes changes in the relative positional relationship between the cell boundaries. This eliminates wasteful editing work mentioned in connection with the prior art. Because there occurs no change in the relative positions between the target vertical cell boundary and any cell boundary whose horizontal position was different before the movements the relative positional relations between the cell boundaries are controlled in a fine-tuned fashion, with a minimum of changes in these relations.

If there exists no cell boundary Vsame whose horizontal position is the same as that of the target cell boundary vtarget, then the cell boundary Vtarget is moved to the horizontal position of the cell boundary Vright. This means that the positional relationship between the target cell boundary Vtarget and the cell boundary Vright has changed from one in which the cell boundary Vtarget was located to the left of the cell boundary Vright, to one in which the two cell boundaries are horizontally in the same position. Any cell boundary that existed on the left of the target cell boundary Vtarget before the movement still exists on the left after the movement because the target cell boundary Vtarget has moved rightward. Any cell boundary that existed on the right of the target cell boundary Vright before the movement still exists on the right after the movement because the cell boundary Vright coincides with the moved target cell boundary Vtarget. That is, there is no change in the relative positional relationship between the target cell boundary Vtarget on the one hand and any cell boundary other than those which were horizontally in the same position as the cell boundary Vright on the other hand.

The explanation above applies to the case in which a vertical cell boundary is moved right. The explanation also applies where a vertical cell boundary is moved left instead of right or where a horizontal cell boundary instead of a vertical cell boundary is moved up or down.

As described, if there exists no vertical (horizontal) cell boundary whose horizontal (vertical) position is the same as the vertical (horizontal) cell boundary to be moved, the above-described moving process causes changes in the relative positional relationship between the cell boundaries. This eliminates wasteful editing work mentioned in connection with the prior art. Because there occurs no change in the relative positions between the target vertical cell boundary and any cell boundary other than those whose horizontal position was the same before the movement, the relative positional relations between the cell boundaries are controlled in a fine-tuned fashion, with a minimum of changes in these relations.

Figure 7:
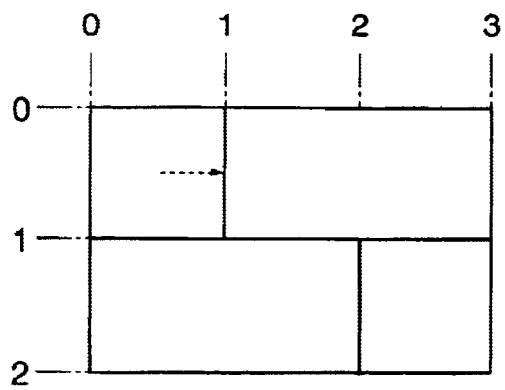
FIG. 7 is an explanatory view showing a first example of a screen display created by the cell boundary movement designating unit.

The processes above will now be described more particularly using specific examples. It is assumed that the cell boundary holding unit 1 initially retains the cell boundaries shown in FIG. 4. FIG. 7 is an explanatory view showing a first example of the display screen created by the cell boundary movement designating unit 2. In step S11 of FIG. 6, the cell boundary movement designating unit 2 provides a display such as the one in FIG. 7 on the basis of the cell boundaries listed in FIG. 4. It is also assumed that the user selectively designates the target cell boundary indicated by a broken line arrow illustratively by touching on a touch-sensitive panel on the screen or by operating the attached pointing device. It is further assumed that the user designates the direction of cell boundary movement illustratively by operating the right arrow key. On detecting such user-initiated commands, the cell boundary movement designating unit 2 specifies that the selected cell boundary be moved in the rightward direction.

In step S12 of FIG. 6, the cell boundary position coincidence judging unit 3 checks the cell boundaries held in the cell boundary holding unit 1 and judges whether or not there exists any vertical cell boundary which has the same horizontal position as the designated cell boundary. Since the designated cell boundary has the horizontal position of 1 in FIG. 7, a check is made to see whether or not the cell boundary holding unit 1 contains, in addition to the designated cell boundary, any vertical cell boundary whose horizontal position is 1. Because a reference to FIG. 4 reveals no cell boundary therein which would meet the condition, step S14 of FIG. 6 is reached.

Because the cell boundary designated by the cell boundary movement designating unit 2 is a vertical cell boundary, the cell boundary moving unit 4 detects in step S14 of FIG. 6 a cell boundary which exists in the direction designated for the cell boundary in question and which, among the vertical cell boundaries retained, is horizontally closer than any other cell boundary to the designated cell boundary. In this example, the cell boundary moving unit 4 detects a cell boundary which has a horizontal position of 2 and a vertical position of 1 for the starting point and a horizontal position of 2 and a vertical position of 2 for the end point, as listed on line 3 in FIG. 4. Because the horizontal position of the cell boundary in question is 2, the cell boundary moving unit 4 changes to 2 the horizontal position of the cell boundary (on line 2) designated inside the cell boundary holding unit 1.

Figures 8, 9:
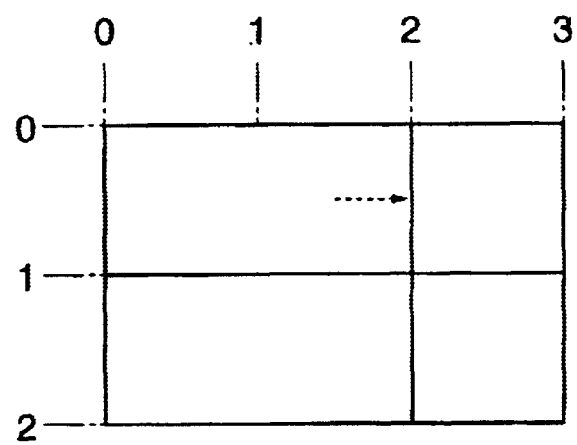
FIG. 8 is an explanatory view listing typical contents of the cell boundary holding unit after a moving process.
FIG. 9 is an explanatory view illustrating a second example of the screen display created by the cell boundary movement designating unit.

FIG. 8 is an explanatory view listing typical contents of the cell boundary holding unit after the moving process, and FIG. 9 is an explanatory view illustrating a second example of the screen display created by the cell boundary movement designating unit. The moving process described above changes the contents in FIG. 4 of the cell boundaries held by the cell boundary holding unit 1 to those shown in FIG. 8. As indicated in FIG. 8, the horizontal position of the cell boundary on line 2 has been changed. The change in the contents of the cell boundary holding unit 1 causes the cell boundary movement designating unit 2 to generate the screen display shown in FIG. 9. That is, the two vertical cell boundaries which were staggered crosswise have come to the same horizontal position following the moving process that causes structural changes of the table.

As an example, if the designated cell boundary is moved illustratively to a halfway point in the range of the movement from FIG. 7 to FIG. 9 (i.e., between horizontal positions 1 and 2), there is no change in the tabular structure. Such a moving operation is thought to be wasteful for conventional systems designed to permit automatic tabulation With this invention, the moving process involves structure changes of the table in question so that the user's moving operations will not be done in vain during automatic tabulation.

As another example, it is assumed that the cell boundary holding unit 1 retains the cell boundaries shown in FIG. 8 and that the screen display of FIG. 9 is given by the cell boundary movement designating unit. In that case, suppose that the user designates selectively the cell boundary indicated by a broken line arrow in FIG. 9 and further operates the right arrow key to specify the direction of cell boundary movement. Then the cell boundary movement designating unit 2 detects the user-initiated commands and specifies accordingly that the selected cell boundary be moved rightward.

In step S12 of FIG. 6, the cell boundary position coincidence judging unit 3 checks the cell boundaries held in the cell boundary holding unit 2 to see whether or not there exists, among the vertical cell boundaries retained, any cell boundary that has the same horizontal position as the designated cell boundary. Because the horizontal position of the designated boundary is 2, a check is made to see whether or not the cell boundary holding unit 1 contains besides the designated cell boundary any vertical cell boundary whose horizontal position is 2. The cell boundary listed on line 3 in FIG. 8 meets the condition, and step S13 of FIG. 6 is reached accordingly.

Because the cell boundary designated by the cell boundary movement designating unit 2 is a vertical cell boundary, the cell boundary moving unit 4 detects in step S13 of FIG. 6 a cell boundary which exists in the direction designated for the cell boundary in question and which, among the vertical cell boundaries retained, is horizontally closer than any other cell boundary to the designated cell boundary. In the case above, the cell boundary moving unit 4 detects a cell boundary which has a horizontal position of 3 and a vertical position of 0 for the starting point and a horizontal position of 3 and a vertical position of 2 for the end point, as listed on line 4 in FIG. 8. Because the horizontal position of the detected cell boundary is 3, a horizontal position of 2.5 is obtained as a halfway point between the detected cell boundary's horizontal position of 3 on the one hand and the horizontal position of 2 in effect before the movement of the designated cell boundary on the other hand. The cell boundary moving unit 4 then changes to 2.5 the horizontal position of the cell boundary designated inside the cell boundary holding unit 1.

Figures 10, 11:
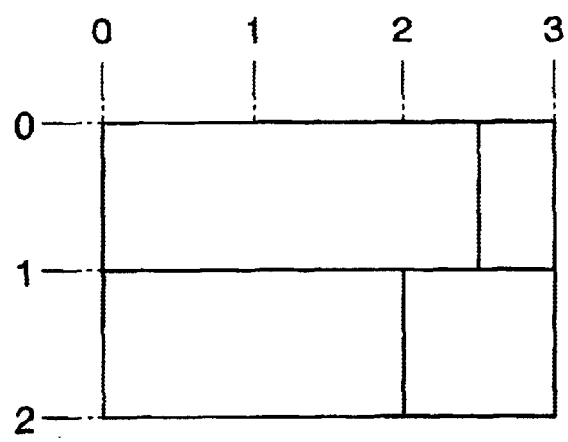
FIG. 10 is an explanatory view indicating other contents of the cell boundary holding unit after a moving process.
FIG. 11 is an explanatory view representing a third example of the screen display created by the cell boundary movement designating unit.

FIG. 10 is an explanatory view indicating other contents of the cell boundary holding unit after the moving process, and FIG. 11 is an explanatory view representing a third example of the screen display created by the cell boundary movement designating unit. The moving process described above changes the contents in FIG. 8 of the cell boundaries held by the cell boundary holding unit 1 to those shown in FIG. 10. As indicated in FIG. 10, the horizontal position of the cell boundary on line 2 has been changed from 2 to 2.5. The change in the contents of the cell boundary holding unit 1 causes the cell boundary movement designating unit 2 to generate the screen display shown in FIG. 11. The two cell boundaries whose positions coincided vertically have come to be staggered crosswise following the moving process that causes structural changes of the table.

FIG. 12 is an explanatory view exhibiting a fourth example of the screen display created by the cell boundary movement designating unit. This example is one in which horizontal cell boundaries are moved. The workings of the embodiment in moving horizontal cell boundaries are essentially the same as those in moving vertical cell boundaries. Below is only an outline of what takes place, and details of the workings will not be described.

Suppose that the user designates a downward movement of a horizontal cell boundary indicated by a broken line arrow in FIG. 12. Because no other cell boundary exists in the same vertical direction, the designated cell boundary is moved to position 1, i.e., the vertical position of the horizontal cell boundary vertically the closest to the designated cell boundary.

After the movement, another cell boundary is encountered in the same vertical direction while the same horizontal cell boundary is moved further downward. The designated cell boundary comes to position 2, i.e., a halfway point between the vertical position before the movement (position 1) and that of the horizontal cell boundary vertically the next closest to the target cell boundary. A further downward movement brings the designated cell boundary to position 3.

As described, the embodiment of the present invention moves cell boundaries in a way that changes the structure of the table of interest. This means that tabular editing work is not performed in vain when contents are subsequently assigned to cells in order to determine their sizes automatically.

In the specific examples above, a single cell boundary was shown to be designated for each movement. Alternatively, the cell boundary movement designating unit 2 may be arranged to designate multiple cell boundaries for a collective movement.

In the above examples, a cell boundary itself was shown designated by the cell boundary movement designating unit 2 at the time of the user's designation of the cell boundary in question. However, the user need not directly designate cell boundaries. Many other alternative methods may be used to designate cell boundaries. Illustratively, a cell may be designated and an arrow key operated therein so that the cell boundary movement designating unit 2 will designate the cell boundary located in the direction of the arrow key thus operated inside the cell of interest.

In the foregoing description, the cell boundary holding unit 1 was shown holding the positions of starting and end points of cell boundaries. Alternatively, any other kind of information may be stored as long as the positions of cell boundaries are clearly identified thereby. Illustratively, if cells are all set to be rectangular, it is possible to hold information about either the top right vertex position of each cell along with its size, or the top right and bottom left vertex positions of each cell for cell boundary identification.

If information about cell boundaries or cell positions is not retained, other forms of information may be stored as long as the relative positional relations between cell boundaries are clearly identified thereby. For example, groups of vertical and horizontal cell boundaries may be retained in the form of a list, each group including cell boundaries in the same position, the groups being sorted according to the cell boundary positions within the list. FIG. 13 is an explanatory view of another typical table, and FIG. 14 is an explanatory view of cell boundaries retained by the cell boundary holding unit 1 regarding the table of FIG. 13. The cell boundaries of the table in FIG. 13 may be expressed illustratively in relative positional relations constituting information such as is shown in FIG. 14. In this example, the vertical cell boundaries from left to right in the table of FIG. 13 are retained from top to bottom in FIG. 14. The cell boundaries included in each line of the table make up a group of cell boundaries having the same horizontal position. By referring to such cell boundary information, it is possible to check easily the horizontal relative positions of vertical cell boundaries. Needless to say, vertical relative positions of the horizontal cell boundaries are also retained likewise by the cell boundary holding unit 1. Apart from this example, many other forms of information may be used in order to store cell boundaries.

As described and according to the present invention, cell boundaries are moved in such a manner that the structure of the table in question is changed. Wasteful moving operations by the user are eliminated, with a minimum of changes taking place in relative positional relations between cell boundaries following their movements. Such features allow the relative positional relationship between the cell boundaries to be controlled in a fine-tuned fashion, whereby the user is able to edit tables as desired in an easy-to-use operating environment.

As many apparently different embodiments of this invention may be made without departing from the spirit and scope thereof, it is to be understood that the invention is not limited to the specific embodiments thereof except as defined in the appended claims.

What is claimed is:

1. A table editing apparatus comprising:

cell boundary holding means for retaining cell boundaries;

cell boundary movement designating means for designating a cell boundary to be moved and a direction in which to move the cell boundary;

cell boundary position coincidence judging means that is used if the cell boundary designated by the cell boundary movement designating means is a vertical cell boundary, the judging means thereupon judging whether or not there exists in the cell boundary holding means any other cell boundary which is vertical in direction and which has the same horizontal position as the designated cell boundary; and cell boundary moving means for moving the cell boundary designated by the cell boundary movement designating means;

wherein, if the cell boundary position coincidence judging means has judged that there exists another cell boundary having the same position within the cell boundary holding means and if the cell boundary designated by the cell boundary movement designating means is a vertical cell boundary, then the cell boundary movement designating means moves the vertical cell boundary to a half-way point between a pre-movement position and the vertical cell boundary position of the next closest cell in the moving direction.

2. A table editing apparatus comprising:

cell boundary holding means for retaining cell boundaries;

cell boundary movement designating means for designating a cell boundary to be moved and a direction in which to move the cell boundary;

cell boundary position coincidence judging means that is used if the cell boundary designated by the cell boundary movement designating means is a vertical cell boundary, the judging means thereupon judging whether or not there exists in the cell boundary holding means any other cell boundary which is vertical in direction and which has the same horizontal position as the designated cell boundary; and cell boundary moving means for moving the cell boundary designated by the cell boundary movement designating means;

wherein, if the cell boundary position coincidence judging means has judged that there is no other cell boundary having the same position within the cell boundary holding means and if the cell boundary designated by the cell boundary movement designating means is a vertical cell boundary, then the cell boundary movement designating means moves the vertical cell boundary until the vertical cell boundary coincides with the vertical cell boundary of the next closest cell in the moving direction.

3. A table editing apparatus comprising:

cell boundary holding means for retaining cell boundaries;

cell boundary movement designating means for designating a cell boundary to be moved and a direction in which to move the cell boundary;

cell boundary position coincidence judging means that is used if the cell boundary designated by the cell boundary movement designating means is a horizontal cell boundary, the judging means thereupon judging whether or not there exists in the cell boundary holding means any other cell boundary which is horizontal in direction and which has the same vertical position as the designated cell boundary; and cell boundary moving means for moving the cell boundary designated by the cell boundary movement designating means;

wherein, if the cell boundary position coincidence judging means has judged that there exists another cell boundary having the same position within the cell boundary holding means and if the cell boundary designated by the cell boundary movement designating means is a horizontal cell boundary, then the cell boundary movement designating means moves the horizontal cell boundary to a half-way point between a pre-movement position and the horizontal cell boundary position of the next closest cell in the moving direction.

4. A table editing apparatus comprising:

cell boundary holding means for retaining cell boundaries;

cell boundary movement designating means for designating a cell boundary to be moved and a direction in which to move the cell boundary;

cell boundary position coincidence judging means that is used if the cell boundary designated by the cell boundary movement designating means is a horizontal cell boundary, the judging means thereupon judging whether or not there exists in the cell boundary holding means any other cell boundary which is horizontal in direction and which has the same vertical position as the designated cell boundary; and cell boundary moving means for moving the cell boundary designated by the cell boundary movement designating means;

wherein, if the cell boundary position coincidence judging means has judged that there is no other cell boundary having the same position within the cell boundary holding means and if the cell boundary designated by the cell boundary movement designating means is a horizontal cell boundary, then the cell boundary movement designating means moves the horizontal cell boundary until the horizontal cell boundary coincides with the horizontal cell boundary of the next closest cell in the moving direction.

* * * * *